Patented Mar. 19, 1940

2,194,076

UNITED STATES PATENT OFFICE 2,194,076

HYDROAROMATIC CYANAMIDES

Richard O. Roblin, Jr., Stamford, Conn., assignor to American Cyanamid Company, New York, N. Y., a corporation of Maine No Drawing. Application May 23, 1939,
Serial No. 275,218

6 Claims. (Cl. 260—551)

This invention relates to new disubstituted cyanamide compounds of the formula—

where R represents a hydroaromatic radical and R' represents a radical chosen from the group consisting of alkyl and aralkyl radicals.

These compounds may be generally prepared in an inert solvent such as benzene or petroleum ether fractions, by the reaction between the corresponding secondary amine and cyanogen chloride. A preferred equation for this reaction is as follows:

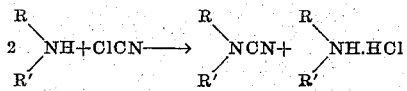

Example I 6.1 grams of cyanogen chloride are dissolved in 100 cc. of benzene. After cooling the solution to 0°–5° C., 22.6 grams of cyclohexyl methyl amine are gradually added with stirring. When this addition is completed, the cyclohexyl methyl amine hydrochloride is filtered off and washed with benzene. The washings and filtrate are united. The benzene is removed by distillation under reduced pressure. The residue is vacuum distilled and the product identified as cyclohexyl methyl cyanamide.

Example II 6.1 grams of cyanogen chloride are dissolved in 150 cc. of benzene. After cooling the solution to 0°–5° C., 28.2 grams of cyclohexyl propyl amine are gradually added with stirring. When this addition is completed, the cyclohexyl propyl amine hydrochloride is filtered off and washed with benzene. The washings and filtrate are united. The benzene is removed by distillation under reduced pressure. The residue is vacuum distilled and the product identified as cyclohexyl propyl cyanamide.

Example III 6.1 grams of cyanogen chloride are dissolved in 200 cc. of heptane. After cooling the solution to 0°–5° C., 37.8 grams of cyclohexyl benzyl amine are gradually added with stirring. When this addition is completed, the cyclohexyl benzyl amine hydrochloride is filtered off and washed with heptane. The washings and filtrate are united. The heptane is removed by distillation under reduced pressure. The residue is vacuum distilled and the product identified as cyclohexyl benzyl cyanamide.

Similarly other disubstituted cyanamides of the above classes may be prepared utilizing the corresponding secondary amine.

It is to be understood that the above examples are illustrative only.

These new compounds are adapted for various uses, more particularly as intermediates and insecticides.

While the invention has been described with particular reference to specific embodiments, it is to be understood that it is not to be limited thereto but is to be construed broadly and restricted solely by the scope of the appended claims.

I claim:

1. As a new compound, a disubstituted cyanamide of the formula—

where R represents a hydroaromatic radical and R' represents a radical chosen from the group consisting of alkyl, and aralkyl radicals.

2. As a new compound, a disubstituted cyanamide of the formula—

where R represents a hydroaromatic radical and R' represents an alkyl radical.

3. As a new compound, a disubstituted cyanamide of the formula—

where R represents a hydroaromatic radical and R' represents an aralkyl radical.

4. As a new compound, cyclohexyl methyl cyanamide.

5. As a new compound, cyclohexyl propyl cyanamide.

6. As a new compound, cyclohexyl benzyl cyanamide.

RICHARD O. ROBLIN, Jr.